Nov. 3, 1959  W. M. JACKSON II  2,910,760
METHOD OF FIRING CERAMIC COMPOSITION
Filed May 21, 1954
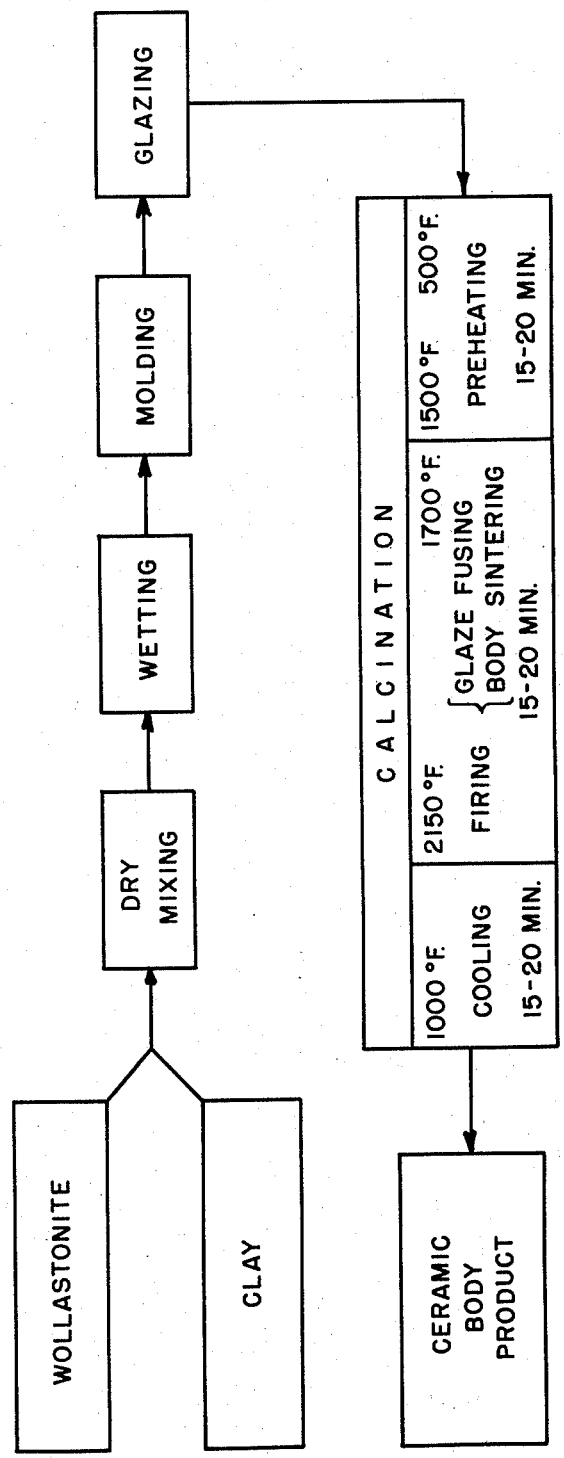
INVENTOR.
WILLIAM M. JACKSON II
BY

2,910,760

METHOD OF FIRING CERAMIC COMPOSITION

William M. Jackson II, Watertown, Mass., assignor to Godfrey L. Cabot, Inc., Boston, Mass., a corporation of Massachusetts Application May 21, 1954, Serial No. 431,615

2 Claims. (Cl. 25—157)

This invention relates to the art of manufacturing ceramic bodies, especially porous-bodied ceramic products having a glazed surface such as tiles, blocks, etc. More particularly, this invention relates to porous-bodied ceramic compositions especially adapted to be cured in a rapid once-fired baking process during which the glazing of the body is also accomplished and includes a method of making the glazed porous-bodied articles in an exceptionally fast-burning cycle.

Traditionally the manufacture of ceramic articles has been a time consuming affair, particularly in the firing step. While the art has advanced to some extent in reducing firing time from days to hours (about 14 hours for the process of U.S. Patent No. 2,241,705 Goodrich) and from two separate firings to a single firing, the baking of ceramic articles has, prior to my invention, always been a slow process. Efforts to decrease firing time further met with little success prior to my invention because the conditions essential for short firing of conventional glazed bodies resulted in the formation of blisters, blown spots and other irregularities, particularly in tile bodies.

I have now discovered a novel ceramic base composition which can be converted to the non-vitreous ceramic state in the incredibly short single firing time of less than one hour without substantial increase in firing temperature. Furthermore, the ceramic bodies produced from the novel composition of this invention are in no way inferior to comparable bodies of the prior art but on the contrary are superior thereto in certain properties, notably in size stability and flexural and compressive strength. The compositions of this invention are particularly useful for tile bodies.

It is an important object of this invention to effect great economy in firing time without any sacrifice of important physical characteristics and properties of the finished articles so produced.

It is also an object of this invention to obtain tiles and similar glazed articles of outstanding strength and with improved resistance to shivering, spalling and other structural failures.

Another object of this invention is the provision of a unique process for manufacturing glazed articles, such as tiles which features an exceptionally fast firing cycle, the use of moderate firing temperatures and very significant economies in processing costs.

Additional objects and advantages will be apparent from the detailed description of the invention which follows:

The various objects of my invention are attained by providing a novel ultra-fast firing ceramic body composition comprising:

| | Percent by weight |
|---|---|
| Mineral grade calcium metasilicate | 50–80 |
| Alkali (reported as oxide) | about 0.3–1.5 |
| Kaolinite | 10–40 |
| Excess silica | about 3–15 |
| Magnesia | 0–1 |

Within the ranges specified these materials combine chemically very rapidly at the usual firing temperatures to produce an excellent ceramic body. Outside of the specified range there is a degradation of product quality at ultra fast firing conditions so I conclude that the indicated proportions of ingredients in my novel composition are critical.

Going into greater detail, the mineral grade calcium metasilicate specified herein is preferably the naturally occurring mineral wollastonite but may also be the product obtained by calcining lime or limestone in the presence of silica. Whatever its source, the calcium metasilicate must contain at least 95% $CaSiO_3$ and no more magnesium than 1% MgO equivalent. For use in the composition of this invention the calcium metasilicate must be reasonably finely ground so that substantially all will pass through a 60 mesh screen and at least about 50% by weight will pass through a 200 mesh screen. The sieve analysis for ideal grinds is about as follows: at least 99% through 60 mesh, 92–98% through 200 mesh, 50–85% through 325 mesh.

Of the other constituents of the novel composition of this invention all will be found combined in the critical proportions in some ball clays or may be obtained by properly combining different ball clays with one another or with low excess silica kaolins. Even a very small proportion, not in excess of about 5%, of some bentonitic "clays" may be tolerated. Thus to obtain the composition of this invention the relation of the effective ingredients other than the calcium metasilicate, which for convenience will be referred to hereinafter generally as "clay," to one another will be approximately as follows:

TABLE I

| | Percent by weight |
|---|---|
| Alkalies (reported as oxides of Na, K & Li) | 1.2–3 |
| Magnesium (reported as MgO) | 0–1 |
| Kaolinite | 50–80 |
| Excess silica | 12–30 |

The common minor ingredients of clays other than the alkali metal oxides and MgO specified above are usually reported as oxides of such elements as iron, titanium, calcium, manganese, copper, sulfur, and carbon among others, as shown for example by the list of common clay ingredients on pages 19–21 of the book "Kavlen Clays and Their Industrial Uses," 2nd Edition, published 1955 by J. M. Huber Corp. of New York City.

As is well known to those skilled in the art various methods of analysis are available by which to estimate the probable minerals content of ceramic base compositions. Values for excess silica set forth in this specification are calculated values obtained from the ultimate analysis figures for alkalies, alumina and silica. This calculation involves first a rational apportioning of the stoichiometric amounts of silica and alumina required to combine with the alkalies as the corresponding feldspars and similar alkali alumino silicate minerals, namely $K_2O.Al_2O_3.6SiO_2$ (orthoclase or microcline), $Na_2O.Al_2O_3.6SiO_2$ (albite) and $Li_2O.Al_2O_3.4SiO_2$ (spodumene), all of these minerals being classed in the ceramics art generically as feldspars by reason of their chemical rather than their mineralogical compositions. The "excess silica" is then obtained by difference by subtracting the sum of the amount of $SiO_2$ apportioned to feldspars, and the stoichiometric amount needed to combine, as kaolinite ($Al_2O_3.2SiO_2.2H_2O$), with the remaining alumina not assigned to feldspars, from the figure for total silica. The actual amount of free or uncombined silica in the composition is probably somewhat less than the figure for "excess silica" in most cases due to the existence of some silica in combined forms other than those assumed.

It may also be noted that rational analysis of the clay will indicate an equivalent kaolinite content of between 50 and 80% so that the composition of this invention will always have a kaolinite content of between 10 and 40%.

Certain natural ball clays will analyze within the specifications of Table I and hence being readily available, are preferred as the clay element of my novel composition. However, as I have said, blending other clays and minerals to provide a mixture having the requisite relatively high silica and feldspathic (alkali alumino-silicate) minerals content will serve as well and may even be preferred for regions of manufacture where it is of economic advantage to use such blends.

Whatever its source, substantially all of the clay material of my novel composition should be composed of particles less than 325 mesh in size and preferably should have a particle size distribution comparable to that of ball clays, that is, to result in a median equivalent spherical diameter of about 0.5-5 microns.

As I have said, certain commercially available clays fit the specifications for the clay portion of my novel composition. One such is that known as Spinks Bandy Tan, a ball clay mined and sold by the H. C. Spinks Clay Co., Inc., of Paris, Tennessee. The ultimate chemical analysis of this clay shows the following:

TABLE II

| | Percent by weight |
|---|---|
| $SiO_2$ | 61.2 |
| $Al_2O_3$ | 24.4 |
| MgO | 0.58 |
| $Na_2O$ | 0.36 |
| $K_2O$ | 1.64 |
| Ignition loss | 8.67 |
| Impurities | 3.15 |

From these figures the following values can be calculated:

| Assumed Compound | Percent by weight | Percent $SiO_2$ Contained |
|---|---|---|
| Albite ($Na_2O.Al_2O_3.6SiO_2$) | 3.05 | 2.09 |
| Orthoclase or microcline ($K_2O.Al_2O_3.6SiO_2$) | 9.70 | 6.29 |
| Kaolinite ($Al_2O_3.2SiO_2.2H_2O$) | 55.8 | 25.93 |
| Total | | 34.31 |

The characteristic chemical parameters for this clay are therefore as follows:

| | Percent by weight |
|---|---|
| Total alkalis (reported as oxides) | 2.0 |
| Magnesium (reported as MgO) | 0.58 |
| Kaolinite | 55.8 |
| Excess silica | 26.9 |

These values will all be seen to lie within the desirable range previously stated. Clays conforming to those aforesaid specifications may be described generally as high-silica ball clays having a high content of alkali or feldspathic components. Taken individually, not all of the commercially available ball clays possess these desired characteristics. However, by suitable blending, ball clays not individually suitable may be used as raw materials. In some cases it is possible to use successfully a blend of two clays neither of which individually would be satisfactory, such as the two ball clays analyzed below which are sold by Kentucky-Tennessee Clay Co. of Mayfield, Kentucky.

| Clay | Total Alkali, percent | MgO, percent | Kaolinite, percent | Excess Silica, percent |
|---|---|---|---|---|
| K-2 Ivory | 0.45 | 0.4 | 65.1 | 25.2 |
| K-T No. 5 Ball | 2.31 | 0.34 | 74.2 | 5.7 |
| 50-50 mixture of above clays | 1.38 | 0.37 | 69.6 | 15.4 |

It will be seen that the chemical parameters of the mixture are within the desired range although either the alkali or the silica content of the individual clay is outside of limits.

Even kaolin clays which are always low in excess silica and are generally also too low in alkali content for the purpose of the present invention can be used in blends as part of the clay constituent of the composition of this invention. For example, such kaolins of proper particle size, can be used with sufficient ball clay high in both silica and alkali to bring the alkali and silica content of the mixture within limits. In fact, except for the bentonite, almost any clayey material can be used in appreciable quantities. Bentonites and bentonitic clays, however, are characterized by relatively high magnesia content and excessive plasticity and tend to swell immensely when wet. For these reasons, they are not well-suited for use in the composition of the present invention and should never comprise more than 5% and preferably not more than 2% by weight of the clay portion of my bisque forming composition.

For example, it is possible by the addition of appropriate quantities of finely-divided feldspathic and other chemically analogous alkali-alumino-silicate minerals such as orthoclase, microcline, albite, nepheline, lepidolite, or spodumene, or mixtures thereof, and/or of finely divided silicas, such as quartz, tripoli, flint or manufactured silica aerogels, etc., to convert kaolin or ball clays which in the natural state contain insufficient quantities of either or both of the alkali and silica components into synthetic or modified "clays" suitable for use as raw materials in this invention.

In choosing the calcium silicate ingredient as well as the clay portion of my ceramic composition, it is often desirable to limit the content of iron, manganese, cobalt and other discolorizing impurities as much as possible. This is particularly true when extremely light-colored bodies are desired. However, the precaution is never absolutely necessary in making glazed porous-bodied articles because it is possible to mask completely the color of the porous body or bisque by application of an intermediate layer or engobe to the body prior to the glazing material. The use of these intermediate layers or engobes is well known in the ceramic art. They are usually based on a very white burning clay, such as china clay or high grade kaolins, and contain sufficient fluxes and silica to produce a composition with the proper vitrification temperature and with properties intermediate those of the body and the glaze.

The process for making wall tile and similar glazed porous-bodied articles in a fast-fire cycle according to my invention consists of the following steps. A dry mixture is made first by compounding clay having the properties specified hereinbefore with a calcium silicate ingredient of the type described above in the proper proportions. The usual procedure for forming a mixture for dry pressing is followed. Sufficient water, usually about 6-10% by weight of the dry mixture, is added to make the mixture form-retaining on pressing. In general, the higher the proportion of the clay material the greater the amount of water which should be added. The wetted mixture is then mulled in order to incorporate the moisture thoroughly and uniformly through the dry ingredients. After the wetted mixture has been thoroughly mulled, the porous bodies are pressed by the standard procedures well known in the art. These involve breaking up any large lumps, introducing prescribed amounts of the granular mixture into molds and pressing in standard presses using pressures of several thousand pounds or more. The resulting pressed bodies are ready for immediate firing if desired and no preliminary drying step or aging period is required.

In the preferred embodiment of this invention a continuous assembly line operation is contemplated in which, immediately after pressing, the porous bodies are placed on a conveyor belt and passed through a zone in which the glaze is sprayed on and thence directly into the firing kiln. When an engobe is used, it is, of course, applied to the pressed body prior to the glazing operation. While the glaze is most conveniently sprayed on in most cases, it can also be applied by dipping, or brushing, etc. The problem of fitting a glaze to the porous body or bisque of this invention is not much different from the conventional problem of fitting a glaze to a ceramic body which is to be fired in a conventional process. The chief condition to be observed, as always, is to be sure that the coefficient of expansion of the glaze material bears the proper relationship to that of the bisque. Many different types of glaze composition are suitable including many more or less conventional ones.

The most important single criterion for a glaze is that it have a coefficient of expansion near that of the body but never higher than that of the body in order to avoid crazing and, preferably, slightly lower but not so much lower as to cause "shivering." Other desirable characteristics of a glaze for a single fire process are that it have a fusing point just sufficiently below that of the maximum firing temperature of the bisque body so that at firing temperature glaze and bisque will flow together smoothly, the glaze penetrating the body only slightly, thereby avoiding any reaction or gas formation which would cause pitting or other surface roughness. In connection with the present invention, it is preferable that the glaze be substantially free of lead, especially for the lighter colored glazes. For this reason, it is desirable to minimize the lead-containing frits as much as possible.

One particular glaze composition which has been used with good results in my porous-bodied pressed ware made as described above is as follows:

TABLE III

| Ingredient: | Percent by weight |
| --- | --- |
| $CaSiO_3$, mineral grade | 15 |
| Flint | 23 |
| Pemco P-238 frit | 32 |
| Ultrox opacifier [1] | 12 |
| Zinc oxide | 8 |
| Spinks C & C clay | 10 |
| Total | 100 |

[1] Zirconium silicate.

The frit composition should be finely subdivided and preferably will be ground prior to application to the point that it is substantially free of particles larger than 325 mesh. This is usually accomplished by wet ball milling the mixture in the presence of 40 to 60% water based on the weight of the solid composition. Most of the ingredients, other than the frit are easily obtainable in a fine state of subdivision but it is not necessary that they be completely ground before being added to the mixture. For example, the same grind of calcium metasilicate used in the bisque composition can be used in the glaze, which means that initially it may contain a substantial portion of particles between 60 and 325 mesh in size. Since calcium metasilicate is the major constituent of the bisque composition, it is believed that the presence of some of this material in the glaze assists in the bonding of the glaze to the surface of the pressed bisque. Also, it has been found that the use of wollastonite in the glaze reduces the amount of frit required and thereby lowers the cost of the glaze. The composition of the Pemco P-238 frit specified above is as follows:

| Ingredient: | Percent by weight |
| --- | --- |
| $K_2O$ | 3.1 |
| $Na_2O$ | 7.2 |
| $Al_2O_3$ | 16.3 |
| $B_2O_3$ | 31.7 |
| $SiO_2$ | 41.5 |
| Total | 100.0 |

The Spinks C & C clay specified above is merely a typical ball clay of average chemical composition and relatively high suspending power, due to its rather high content of colloidal particles, i.e., particles below about 1 micron in equivalent spherical diameter.

After the glaze has been ground and uniformly dispersed by wet ball milling, additional water is usually added to bring it to the desired consistency for application. Such glazes are thixotropic mixtures and, for spraying, are usually adjusted to a solids content of about 45% by weight. Ordinarily these glaze slurries can be made up ahead of time and stored for later use, provided that they are well stirred and any settled solids uniformly redispersed before use. For maximum utility of the present invention, the green pressed body is immediately sprayed with a uniform layer of the glaze slurry and conveyed directly into the calcining apparatus.

The calcination of the pressed porous body formed as indicated above is normally carried out in a kiln or oven which can be heated by any suitable means. In my process the pressed body, sprayed or unsprayed, is matured in an exceptionally rapid heating cycle by conducting it continuously or intermittently by a suitable conveyor through a suitable calcining apparatus heated in such a fashion that the temperature gradually increases from the entrance until a maximum is reached at some point in the middle third of the length and then gradually decreases from there to the exit.

The entire process, including the mixing of the ingredients and pressing of the body, is shown in the accompanying flow-sheet. As indicated therein, in a typical firing cycle the pressed body will first be preheated for about 15 to 20 minutes as it is subjected to temperatures gradually increasing from about 500° F. or more to about 1500° F. or more. During this portion of the cycle it is believed that the mechanically held moisture as well as substantially all of the water of hydration, most of which is present in the kaolinite, is removed from the body. (Apparently, one of the most important characteristics of my compositions and one of the factors most responsible for the extremely short firing cycle is the ease with which water is lost from the pressed bodies formed as disclosed herein.) The pre-heated and dehydrated body then reaches the middle zone of the kiln where, with temperatures of 1700–1900° F. and over, the maximum heating takes place. For the fastest firing at some point the ambient temperature is brought above at least about 2000° F., and preferably to about 2045–2150° F. and even slightly higher. In this zone the actual firing phase of the cycle is accomplished within a residence time of about 15 to 20 minutes. In this phase not only does the required amount of sintering take place in the porous body but the glaze, if present, is fused and leveled and bonded to the body. The final phase of the firing cycle requires another 15 to 20 minutes as the body passes through a tempering or cooling zone in which the ambient temperature in the kiln gradually drops from the firing temperatures down to at least about 1100° F. It is desirable that the temperature of the fired bodies at the time of their being discharged from the calcining apparatus shall have been reduced below at least about 1200° F. and ideally to about 1000° F. or less. In this way, I have found that it is possible to produce very attractive glazed porous bodied ceramic articles, such as tiles, in the remarkably fast firing time of 45 to 60 minutes.

While the typical firing cycle described above has been found to be ideal, there is of course considerable variation in the timing of the process in which the advantages of this invention can be obtained. Thus, instead of using 15–20 minutes for each of the three portions of the firing cycle, it is possible to use as little as 10 minutes for each, providing the tiles are not stacked in layers, thus permitting firing cycles as short as 30 minutes. However, for best results firing cycles of about 60 minutes or so are recommended for single layers of tile and about 1 to 2 hours for multilayered firing. There is little advantage, however, in increasing the firing cycles beyond 90 to 120 minutes except that the maximum kiln temperatures which must be employed can be reduced when longer soaking periods are provided. The compositions of this invention still yield very excellent ceramic bodies under such conditions but obviously full advantage will not then be gained from their outstanding adaptability to flash-firing processes.

Very surprisingly, flash-fired tile produced by my invention has proved to be not only as good in all respects as the standard tile commercially produced at present by either a two-fire process or a much longer single fired process involving anywhere from 14 to 20 hours, but in some respects is also vastly superior. Thus, my compositions show less tendency to shrink, especially when flash-fired and therefore can be formed into shapes that can be mass produced more easily with greater uniformity of size. Also, there appears to be less tendency to blowing and other structural defects. Glazed tile produced in accordance with my invention also possess relatively lower moisture expansion characteristics, exceptionally high compressive strength and good resistance to spalling and shivering.

The advantages of this invention and the superiorities of the articles producible thereby are further demonstrated and more specifically pointed out by the following examples which are presented mainly as illustrations to give those skilled in the art a better understanding of how the present invention may be carried into practice. These examples should not, therefore, be considered in any way as limiting the scope of my invention.

*Example I*

Thirty parts by weight of Spinks Bandy Tan ball clay (see Table II) were mixed with 70 parts by weight of wollastonite, which was approximately 99% pure calcium metasilicate and had the following particle size distribution:

Thru mesh screen:                   Percent by weight
  60 ------------------------------------------ 100
  200 ----------------------------------------- 96
  325 ----------------------------------------- 80

About 8 parts by weight of water were added to the blended dry mixture and the moistened material was mulled to uniformly distribute the water through the mass. The resulting plastic mass was passed through a coarse screen to break up any large lumps and was then pressed in a conventional 4¼″ Kinite steel tile die with cushioned edge top surface and ribbed back. Sixteen tons pressure was applied with two bumps in a conventional hydraulic tile press to mold the tile. The resulting pressed tile bodies were then conveyed continuously at a steady rate in a single layer and in single file first through a glazing zone where the glaze composition previously mentioned (Table III) was sprayed on as a slurry of 45% solids concentration and then through the kiln. The latter equipment in this case consisted of a 14½ ft. experimental gas-fired kiln 4 ft. wide. The wire belt on which the tiles were conducted traveled at a speed of about 21 ft./hr. requiring approximately 42 minutes for a given tile to pass through the kiln. The temperature in the kiln reached a maximum of about 2045° F. just beyond the mid-length of the kiln and decreased gradually in both directions from that point, to about 1000° F. at the entrance and exit of the kiln.

The resulting tile produced in this exceptionally fast firing cycle of only 42 minutes were all found to have shrunk less than 1% and less than any tile body based on magnesium silicate or other magnesium containing talc-like minerals previously tested, regardless of firing cycle. It may be noted parenthetically that by contrast such conventional tile bodies almost always shrink from 1% to 3% on firing.

The physical properties of the fast-fire tile produced in this example were measured by means of several of the standard tests of the industry and, by comparison with randomly selected samples of ten different commercial tile now on the market, the adequacy in all respects and the superiority in several respects of the fast-fire tile of this invention was proved. This will be seen from the following summary of results.

TABLE IV

COMPARISON OF FAST-FIRE TILE WITH COMMERCIAL AND THEORETICALLY IDEAL TILES

| Property tested | Fast fire of this invention | Average rating for— | | | |
| --- | --- | --- | --- | --- | --- |
| | | Best commercial | Av. commercial | Worst commercial | Ideal |
| Moisture absorption,[4] percent | 13.4 | ---------- | 11.3–15.6 | ---------- | 12–16 |
| Max. diff. sizing of 10 tile, inches | 0.010 | 0.019 | 0.029 | 0.042 | 0 |
| Flexural strength,[3] p.s.i. | 2,800 | 2,703 | 1,892 | 1,349 | 2,000–3,000 |
| Moisture expansion,[2] 200#, percent | 0.001 | 0.002 | 0.029 | 0.083 | 0 |
| Moisture expansion,[2] 400#, percent | 0.015 | 0.014 | 0.045 | 0.130 | 0 |
| Crazing,[2] 200# | none | none | mild | severe | none |
| Crazing,[2] 400# | mild | none | mild | severe | none |
| Compressive strength | [1] >20,000 | ca. 10,000 | 6,000 | 4,000 | >10,000 |

[1] Too strong to measure in present equipment.
[2] These were determined after autoclaving the tile at the indicated steam pressure for 1 hour.
[3] Modulus of rupture determined by breaking across the ribs on back.
[4] Determined after boiling in water for 2 hours, then shutting off heat and then leaving immersed in water for 22 more hours before removal.

It will be seen from the foregoing example that fast-fired tile made in accordance with this invention has a normal range of moisture absorption and resistance to crazing at 400# steam pressure, and in all other respects is not merely equivalent but actually superior to conventional commercial tile now on the market which are made either by a relatively long single-fired technique or by the well-established two-fire techniques and all of which contain a conventional talc-like mineral as the major component of the porous body or bisque.

Substantially the same results were obtained when tile of the composition described in the above example were fired by moving them intermittently through a small 3′ gas-fired laboratory kiln. In this case, a single layered row of tile lying end to end on the floor of the kiln were moved through the firing cycle by pushing a new tile in the entrance every 6 minutes thus causing a cured tile to be forced out the exit at the other end. This was equivalent to about a 50 minute firing time for a given tile and the kiln temperatures varied from about 500° F. at the entrance up to a maximum of about 2050° F. shortly beyond the mid-length of the kiln and down to about 900° F. at the exit.

Example 2

The same bisque composition described in Example 1 without any glaze was fired in the 3′ laboratory kiln described in the latter part of said example using the same 6 minute push schedule (equivalent to about a 50 minute firing cycle). The effect of firing temperature was studied by varying the maximum kiln temperature from 2000° F. to 2145° F. with the following results:

TABLE V

BISQUE TRIALS

| Property tested | Max. temperature of kiln | | | |
| --- | --- | --- | --- | --- |
|  | 2,000° F. | 2,045° F. | 2,100° F. | 2,145° F. |
| Firing shrinkage, percent | 0.22 | 0.22 | 0.34 | 0.77 |
| Max. diff. size (4 sides), inches | 0.018 | 0.011 | 0.12 | 0.038 |
| Av. diff. size (4 sides), inches | 0.004 | 0.005 | 0.10 | 0.025 |
| Moisture absorption, percent | 16.8 | 16.7 | 17.7 | 15.7 |
| Modulus of rupture, p.s.i. | 1,870 | 2,800 | 3,130 | 3,840 |
| Compressive strength, p.s.i. | 50%[1] >20,000[2] | all >20,000[2] | all >20,000[2] | all >20,000[2] |

[1] The other 50% of tile ran between 15,000 and 20,000.
[2] The highest value measurable on present equipment.

It will be seen that the properties of the above bisque bodies are amazingly uniform over an exceptionally wide range of firing temperatures. The color of the products of all of the above runs was very good also with no indication of significant discoloration such as might be caused by overfiring. This indicates, of course, that the fast firing of my ceramic compositions is very easy to control. It will be noted that there is some increase in flexural strength and in shrinkage as the firing temperature is raised. However, except for a slightly low value on modulus of rupture at 2000° F., all of these values are very satisfactory and better than most present day commercial products. Moreover, it has been found that the compressive strength of these bodies is so high that a glaze having a decidedly lower coefficient of expansion than the body can be applied, such as the glaze composition previously described in Table III for example. When such a glaze is applied it will be in compression and will result in increased strength of the glazed tile body. For example, the glaze previously mentioned when applied to the above bisque bodies in my very fast single-fire process has been found to increase modulus of rupture by about 10%, decrease moisture absorption to about 13.5 to 14% and decrease firing shrinkage even farther than the already low figures shown in the above table (e.g. by half or more).

It has also been found that breaking strength of the fired article can be increased by adding to my bisque composition a small amount, say 1 to 2%, of a fluxing ingredient such as a frit or boron phosphate. However, for most purposes this is neither necessary nor desirable. In the case of tile, for example, breaking strength can be so high as to increase unduly the difficulty of application, because some tile must generally be broken in order to give even coverage of a particular area.

Other specific compositions which can be used as the raw material for a bisque or porous-bodied article made in accordance with the teachings of this invention are shown in the following additional examples.

Example 3

|  | Percent |
| --- | --- |
| Wollastonite | 75 |
| Spinks Bandy Tan Ball clay | 25 |
| Total | 100 |

Example 4

|  | Percent |
| --- | --- |
| Wollastonite | 60 |
| Spinks Haynes Ball clay [1] | 40 |
| Total | 100 |

[1] This clay contains 1.7% alkali, 60.7% kalinite, 22% excess silica, and 0.56% magnesia.

Example 5

|  | Percent |
| --- | --- |
| Wollastonite | 60 |
| Kaolin clay [1] | 25 |
| May Mine Feldspar [2] | 5 |
| Flint [3] | 10 |
| Total | 100 |

[1] This clay consists of about 93% kaolinite and contains about 0.95% alkali and substantially no excess silica.
[2] This contains 14.5% alkali and is ground to such fineness that at least 99% will pass through a 325 mesh screen.
[3] This consists of substantially pure silica and is ground to such fineness that at least 99% will pass through a 325 mesh screen.

Example 6

|  | Percent |
| --- | --- |
| Wollastonite | 50 |
| K-T Ivory Ball clay | 25 |
| K-T No. 5 Ball clay | 25 |
| Total | 100 |

Example 7

|  | Percent |
| --- | --- |
| Wollastonite | 80 |
| Spinks Old Whittler Ball clay [1] | 10 |
| Rex Ball clay [2] | 10 |
| Total | 100 |

[1] This ball clay contains 1.2% alkali, 53% kaolinite, 32.5% excess silica and 0.1% magnesia.
[2] This ball clay, sold by United Clay Mines, contains 2.1% alkali; 64% kaolinite, 19% excess silica and 0.54% magnesia.

Example 8

|  | Percent |
| --- | --- |
| Wollastonite | 68 |
| Spinks Bandy Tan Ball clay | 30 |
| F-4 Kona Feldspar [1] | 2 |
| Total | 100 |

[1] This contains 11.3% alkalis.

In the place of the above feldspar, there may be substituted with good results equal amounts of either nepheline syenite containing about 15% alkali or lepidolite containing about 5.2% alkali.

Another possibility along this line would be the substitution of a suitable glass frit containing about 10–15% alkalis for the feldspar in the above composition. Various feldspars are known which have a theoretical alkali content (reported as oxides) of 5–17% by weight. For example the theoretical alkali content of the more common feldspars is 12% for the sodium type and 17% for the potassium type. Natural feldspathic minerals are usually composed of mixtures of feldspars so that their average alkali contents are normally in the range 12–15%. Consequently the alkali content of the clay contemplated by this invention and indicated to be about 1.2–3% is equivalent to a feldspathic minerals content of about 8–25% or, of the composition of this invention, about 2–12%.

*Example 9*

| | Percent |
|---|---|
| Dehydrated hydrous calcium metasilicate [1] | 65 |
| Rex ball clay | 30 |
| Flint [2] | 5 |
| Total | 100 |

[1] This is a material formed by induration of an intimately dispersed equal molal mixture of CaO and $SiO_2$ in aqueous media for several hours at pressures of about 70–260 p.s.i.a. and temperatures of about 150–200° C., followed by calcination to remove water of hydration. It is then ground to a fineness such that 99% or more by weight below 60 mesh and 70–80% is below 325 mesh.

[2] This material is substantially all of a fineness less than 325 mesh.

It should be noted that natural wollastonite which is calcium metasilicate in the $\beta$ form, or synthetic wollastonite which may be either in the $\alpha$ or $\beta$ form, depending upon the temperature at which the silica and lime are reacted, is preferred over hydrous calcium metasilicate as a starting raw material because the wollastonies occur in a state substantially free of both mechanically held water and water of hydration, and, therefore, need not be calcined prior to use in this invention as required for the hydrous calcium metasilicate.

While I do not wish to be held to any particular theory in explaining the desirable performance of the compositions which I have discovered, the success of my invention is believed to be attributable to several factors as follows:

(1) The ease with which water is removed from the pressed porous-bodied articles which enables the use of a very short preheat phase in the firing cycle.

(2) The tendency of the entire composition to flash-sinter uniformly throughout the intimate admixture of ingredients thus avoiding the necessity of the conventionally employed soaking time in which a fluxing ingredient must first wet and then react with or dissolve other ingredients.

(3) The extraordinarily low thermal expansion of the particular compositions used which eliminates the necessity for a long, slow tempering and cooling phase in the firing cycle in order to avoid thermal shock.

Having fully described my invention and pointed out several preferred embodiments thereof, it will be obvious to those skilled in the art that many other ingredients may be substituted and many other modifications made without departing from the spirit and scope thereof, as defined in the accompanying claims.

I claim:

1. A process of forming a porous-bodied ceramic article having a glazed surface in a single-fire burning operation of from about ½ hour to about two hours which comprises, in combination, the steps of dry mixing a charge comprising essentially from about 50% to about 80% by weight mineral grade calcium metasilicate and from about 20% to about 50% naturally-occurring ball clays; wetting the mixed charge with sufficient moisture to form a plastic mass; molding the plastic mass into suitably shaped articles; then conducting the freshly molded articles in assembly-line fashion first through a glazing zone in which the surface is coated with a suitable glaze and next through a calcination zone in which a maximum temperature of from about 1700° F. to about 2150° F. is maintained at some interior point and a minimum temperature of from about 500° F. to about 1100° F. is maintained near the entrance into and exit from said calcination zone, the average rate at which the articles are moved through said calcination zone being such that the total calcination period for each article is between about ½ hour and two hours.

2. A process of forming a porous-bodied ceramic article having a glazed surface in a single-fire burning operation of from about ½ hour to about two hours which comprises, in combination, the steps of dry-mixing a charge comprising essentially from about 50% to about 80% by weight mineral grade calcium metasilicate and from about 20% to about 50% kaolinite clays of less than 1% magnesia content; wetting the mixed charge with sufficient moisture to form a plastic mass; molding the plastic mass into suitably shaped articles; then conducting the freshly molded articles in assembly-line fashion first through a glazing zone in which the surface is coated with a suitable glaze and next through a calcination zone in which a maximum temperature of from about 1700° F. to about 2150° F. is maintained at some interior point and a minimum temperature of from about 500° F. to about 1100° F. is maintained near the entrance into and exit from the said zone, the average rate at which the articles are moved through the calcination zone being such that the total calcination period for each article is between about ½ hour and two hours.

References Cited in the file of this patent

UNITED STATES PATENTS

| 1,554,225 | Marden et al. | Sept. 22, 1925 |
| 2,347,535 | Bair | Apr. 25, 1944 |
| 2,558,411 | Austin et al. | June 26, 1951 |

OTHER REFERENCES

Snyder et al.: American Ceramic Society Bulletin, vol. 31, No. 7, pages 246–7 (1952).

Jackson: American Ceramic Society Bulletin, vol. 32, No. 9 pages 306–8 (1953).

Ladoo: Engineering and Mining Journal, vol. 151, No. 15, pages 95–7 (1950).